(12) United States Patent
Perryman et al.

(10) Patent No.: US 9,568,280 B1
(45) Date of Patent: Feb. 14, 2017

(54) SOLID NOSE CONE AND RELATED COMPONENTS

(71) Applicant: Lockheed Martin Corporation, Bethesda, MD (US)

(72) Inventors: Gary Paul Perryman, Arlington, TX (US); Bruno J. Evans, Keller, TX (US); Thomas Hiromoto, Dallas, TX (US); Jillian L. Roettiger, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 50 days.

(21) Appl. No.: 14/463,217

(22) Filed: Aug. 19, 2014

Related U.S. Application Data

(60) Provisional application No. 61/908,544, filed on Nov. 25, 2013.

(51) Int. Cl.
*F41G 7/26* (2006.01)
*F41G 7/22* (2006.01)
(Continued)

(52) U.S. Cl.
CPC ............... *F41G 7/26* (2013.01); *F41G 7/2246* (2013.01); *F41G 7/2253* (2013.01);
(Continued)

(58) Field of Classification Search
CPC ............... F41G 7/20; F41G 7/24; F41G 7/26; F41G 7/22; F41G 7/2246; F41G 7/2253; F41G 7/226; F41G 7/222; F41G 7/2273; F41G 7/2293; F42B 12/02; F42B 15/01; F42B 15/34; H01Q 1/42; H01Q 1/422; G01S 3/78; G01S 3/782; G01S 3/789; G01S 17/02; G01S 17/06; G01S 17/66
(Continued)

(56) References Cited

U.S. PATENT DOCUMENTS

| 3,014,353 | A | 9/1959 | Scully et al. |
| 3,435,137 | A | 3/1969 | Altshuler et al. |

(Continued)

FOREIGN PATENT DOCUMENTS

| EP | 0616187 B1 | 3/1994 |
| EP | 0833123 | 4/1998 |

OTHER PUBLICATIONS

Karthikeyan, T.V. et al., "Guided Missiles," Popular Science & Technology Series, 1990, Defence Scientific Information & Documentation Center, http://www.drdo.gov.in/drdo/data/Guided%20Missiles.pdf, 90 pages.

(Continued)

*Primary Examiner* — Bernarr Gregory
(74) *Attorney, Agent, or Firm* — Withrow & Terranova, PLLC

(57) ABSTRACT

A solid nose cone and related components are disclosed. Embodiments include a front-end system for a laser-guided munition. The front-end system includes a solid nose cone that is optically transparent to electromagnetic radiation (EMR) of a particular wavelength. The solid nose cone is configured to pass EMR incident on the exterior surface to the trailing end. An optical relay adapter (ORA) has an EMR-receiving front face and an EMR-emitting rear face. The EMR-receiving front face is optically coupled to the trailing end, and the ORA is configured to relay the EMR from the EMR-receiving front face to the EMR-emitting rear face.

16 Claims, 10 Drawing Sheets

(51) Int. Cl.
*F42B 15/01* (2006.01)
*F42B 12/02* (2006.01)
*F41G 7/00* (2006.01)
*F42B 15/00* (2006.01)

(52) U.S. Cl.
CPC ............ *F41G 7/2293* (2013.01); *F42B 12/02* (2013.01); *F42B 15/01* (2013.01)

(58) Field of Classification Search
USPC ..... 244/3.1–3.19; 343/872, 873, 700 R, 907, 343/909; 342/52–55; 359/642, 708, 711
See application file for complete search history.

(56) References Cited

U.S. PATENT DOCUMENTS

| | | | |
|---|---|---|---|
| 3,841,585 A | 10/1974 | Evers-Euterneck | |
| 3,912,859 A * | 10/1975 | Christopherson | G01S 17/06 244/3.16 |
| 3,954,228 A | 5/1976 | Davis, Jr. | |
| 3,993,907 A | 11/1976 | Veron | |
| 4,006,356 A * | 2/1977 | Johnson | F41G 7/2253 244/3.16 |
| 4,093,154 A | 6/1978 | McLean | |
| 4,168,813 A | 9/1979 | Pinson et al. | |
| 4,245,890 A | 1/1981 | Hartman et al. | |
| 4,436,260 A | 3/1984 | Donelan | |
| 4,500,051 A * | 2/1985 | Cottle, Jr. | F41G 7/226 244/3.16 |
| 4,678,142 A * | 7/1987 | Hirschfeld | F41G 7/226 244/3.16 |
| 4,917,330 A | 4/1990 | Dulat et al. | |
| 4,949,917 A | 8/1990 | Cottle, Jr. et al. | |
| 5,088,659 A * | 2/1992 | Neff | F41G 7/2246 244/3.16 |
| 5,327,149 A * | 7/1994 | Kuffer | F41G 7/2253 342/53 |
| 5,458,298 A * | 10/1995 | Lamelot | G01S 3/789 244/3.16 |
| 5,669,580 A * | 9/1997 | Strauss | F41G 7/2253 244/3.16 |
| 5,693,907 A * | 12/1997 | Rudnik | F42B 15/34 244/3.16 |
| 5,836,540 A * | 11/1998 | Romer | F41G 7/222 244/3.16 |
| 5,973,649 A * | 10/1999 | Andressen | F41G 7/2246 343/909 |
| 5,999,122 A | 12/1999 | Shoucri et al. | |
| 6,091,905 A | 7/2000 | Yahav et al. | |
| 6,160,910 A | 12/2000 | Freifeld | |
| 6,180,938 B1 * | 1/2001 | Crowther | F41G 7/2253 244/3.17 |
| 6,411,331 B1 | 6/2002 | Sansom-Wai et al. | |
| 6,411,445 B1 * | 6/2002 | Jackson | F41G 7/2253 359/711 |
| 6,462,889 B1 * | 10/2002 | Jackson | F41G 7/2253 244/3.17 |
| 6,707,044 B2 | 3/2004 | Lannestedt et al. | |
| 6,959,893 B1 | 11/2005 | Sadowski et al. | |
| 8,130,167 B2 * | 3/2012 | Glabe | H01Q 1/42 343/872 |
| 8,159,407 B2 * | 4/2012 | Dittrich | H01Q 1/422 343/872 |
| 8,581,800 B2 * | 11/2013 | Suematsu | H01Q 1/42 343/872 |
| 9,207,053 B2 * | 12/2015 | Ell | F42B 15/01 |
| 2012/0292431 A1 | 11/2012 | Patel et al. | |

OTHER PUBLICATIONS

Non-Final Office Action for U.S. Appl. No. 13/475,562 mailed Apr. 30, 2014, 8 pages.
Notice of Allowance for U.S. Appl. No. 13/475,562 mailed Sep. 24, 2014, 6 pages.
Author Unknown, "Module 7: Laser Trackers and Alignment Systems," Jun. 23, 2014, Center for Occupational Research and Development (CORD), http://pe2bz.philpem.me.uk/Lights/-%20Laser/Info-999-LaserCourse/C00-M07-LaserTrackersAndAlignmentSystems/module7.htm, 26 pages.
Author Unknown, "In-Line Beam Steerer," Special Optics, Date accessed: Jan. 27, 2016, 2 pages, http://specialoptics.com/products/standard-products/beam-steering-devices/line-beam-steerer/.
Author Unknown, "N1203C Precision Beam Translator," Keysight Technologies, Date Accessed: Jan. 27, 2016, 1 page, http://www.keysight.com/en/pd-156323-pn-N1203C/precision-beam-translator?cc=US&lc=eng.
Li, Yan, et al., "Application of Conformal Optical Design in Star Sensor," International Symposium on Photoelectronic Detection and Imaging 2007: Optoelectronic System Design, Manufacturing, and Testing, Proceedings of SPIE, vol. 5624, 2008, SPIE, 8 pages.
Trotta, Patrick A., "Precision Conformal Optics Technology Program," Window and Dome Technologies and Materials VII, Proceedings of SPIE, vol. 4375, 2001, SPIE, pp. 96-107.
Non-Final Office Action for U.S. Appl. No. 14/724,295, mailed Mar. 11, 2016, 8 pages.
Notice of Allowance for U.S. Appl. No. 14/724,295, mailed Aug. 24, 2016, 7 pages.

* cited by examiner

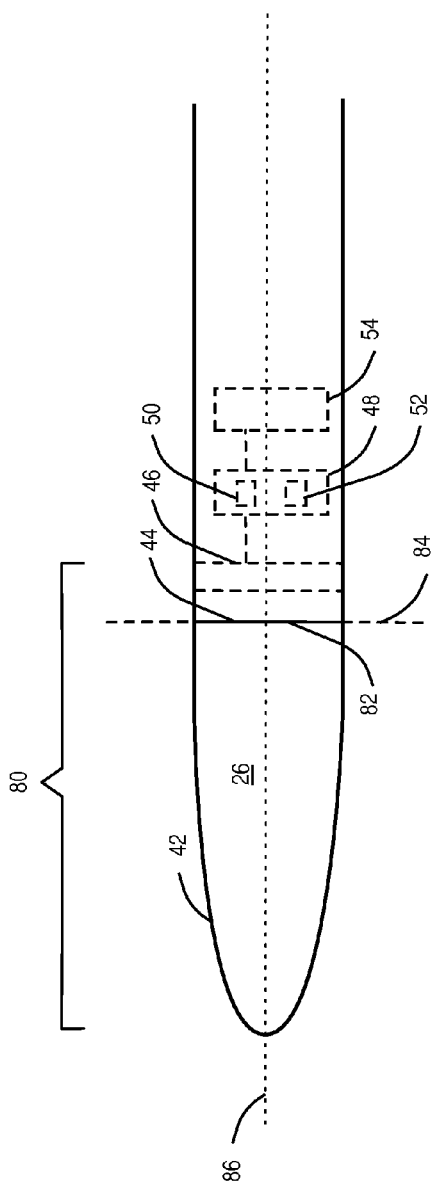
FIG. 9
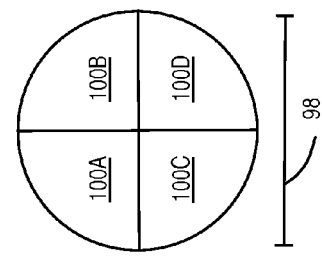
FIG. 11
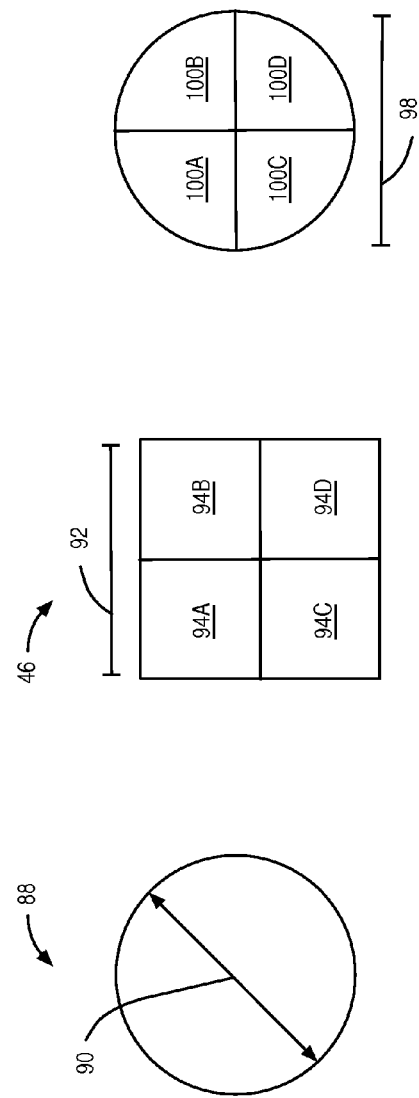
FIG. 10
FIG. 12

SOLID NOSE CONE AND RELATED COMPONENTS

RELATED APPLICATIONS

This application claims the benefit of provisional patent application Ser. No. 61/908,544, filed Nov. 25, 2013, entitled "SOLID NOSE CONE AND OPTICAL RELAY ADAPTER FOR QUADRANT DETECTION," the disclosure of which is hereby incorporated herein by reference in its entirety.

TECHNICAL FIELD

The embodiments relate generally to munitions and, in particular, to a solid nose cone and related components for a laser-guided munition.

BACKGROUND

A laser designator receiver is one mechanism for guiding a missile or other laser-guided munition to a desired target. A laser designator receiver includes a plurality of detector elements, typically at least four detector elements, arranged in a two-by-two grid located in a body of the munition. The laser designator receiver operates in response to electromagnetic radiation (EMR) reflected by the desired target that is received through a window in the nose cone, passed through one or more optical elements, such as a lens arrangement, and then received by the grid of detector elements.

The shape of the nose cone plays a substantial role in the speed and range of a munition. Preferably the shape of a nose cone is as aerodynamic as practicable, to increase range and/or speed of the munition. Unfortunately, a hollow conical nose cone induces substantial distortions in the EMR received through the surface of the nose cone. These distortions reduce the accuracy of the munition and, in some situations, can render the guidance system inoperable. Efforts have been made to design optical systems that correct such distortions prior to passing the EMR to the laser designator receiver, but such optical systems are complex, increasing cost, adding weight to the munition, decreasing munition range and speed, and increasing the number of components that can fail in the munition.

Consequently, to avoid the issues associated with hollow conical nose cones, the window of a conventional laser-guided munition has a relatively thin spherical surface to reduce the distortion of the EMR passing through the window into the munition. Unfortunately, a spherical surface is not an aerodynamic shape and negatively impacts range and speed of the munition.

SUMMARY

The embodiments relate to a nose cone and related components for a laser-guided munition, such as a missile, bomb, or any other laser-guided projectile. In one embodiment, a front-end system includes a solid nose cone that is optically transparent to electromagnetic radiation (EMR) of a particular wavelength. The solid nose cone has an exterior surface, a leading end, and a trailing end, and is configured to pass EMR incident on the exterior surface to the trailing end. An optical relay adapter (ORA) has an EMR-receiving front face and an EMR-emitting rear face. The EMR-receiving front face is optically coupled to the trailing end, and the ORA is configured to relay the EMR from the EMR-receiving front face to the EMR-emitting rear face. In one embodiment, an exterior surface of the solid nose cone is a conical surface. In one embodiment, a ratio of a length of the solid nose cone to a diameter of the solid nose cone is greater than or equal to 3:2. In one embodiment, the solid nose cone comprises one of polycarbonate, glass, acrylic, and sapphire.

In one embodiment, the front-end system includes a quadrant detector directly optically coupled to the EMR-emitting rear face of the ORA.

In one embodiment, the EMR-receiving front face of the ORA forms a plurality of first openings, and the EMR-emitting rear face forms a plurality of second openings. Each second opening corresponds to one of the first openings. The ORA may include a plurality of EMR-passing channels, each EMR-passing channel coupling one of the first openings in the EMR-receiving front face to a corresponding second opening in the EMR-emitting rear face.

In one embodiment, EMR is passed from the trailing end of the solid nose cone to the quadrant detector without a lens.

In another embodiment, a front-end system includes a solid nose cone having a leading end, a trailing end, and a longitudinal axis, wherein the trailing end has a first area size at an intersection location of an exit plane that lies perpendicular to the longitudinal axis and that intersects the trailing end. A quadrant detector is directly optically coupled to the trailing end of the solid nose cone, with no intervening elements between the quadrant detector and the trailing end. In one embodiment, the quadrant detector has a second area size substantially equivalent to the first area size.

In another embodiment, a solid nose cone is provided. The solid nose cone is optically transparent to EMR at at least one wavelength. The solid nose cone has an exterior surface, a leading end, and a trailing end, and is configured to pass EMR of the at least one wavelength incident on the exterior surface through the solid nose cone to the trailing end.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 9 is a block diagram of a front-end system according to another embodiment;

FIG. 10 illustrates a cross-section of a solid nose cone illustrated in FIG. 9;

FIG. 11 is a block diagram of a quadrant detector according to one embodiment; and FIG. 12 is a block diagram of a quadrant detector that is suitable for use in the front-end system illustrated in FIG. 9 according to another embodiment.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The use herein of ordinals in conjunction with an element is solely for distinguishing what might otherwise be similar or identical labels, such as "first opening" and "second opening," and does not imply a priority, a type, an importance, or other attribute, unless otherwise stated herein. The term "about" used herein in conjunction with a numeric value means any value that is within a range of ten percent greater than or ten percent less that the numeric value. The term "waveband" as used herein means a range of wavelengths.

The embodiments relate to laser-guided munitions, such as a missile, bomb, or any other laser-guided projectile, that utilize a quadrant detector for guidance of the munition to a target. In such systems, an airborne or ground-based laser designator illuminates the target with a laser beam. Some energy of the laser beam, in the form of electromagnetic radiation (EMR), is reflected by the target. This reflected energy is received by the munition and is utilized to guide the munition toward the target. While for purposes of illustration a missile may be discussed herein, the embodiments are applicable to any laser-guided munition.

Conventional nose cones are hollow, and include a window that is transparent to EMR in a desired wavelength, or waveband. The window typically has a spherical shape, because hollow nose cones with non-spherical shapes cause distortions in the patterns of the EMR that passes through such surfaces. This distortion can seriously impact the accuracy of the guidance system, or even render the guidance system inoperable. While efforts have been made to design optical systems that correct the distortions, such optical systems are complex, increasing cost, adding weight to the munition, decreasing munition range and speed, and increasing the number of components that can fail in a munition. Unfortunately, the spherical shape of the window is not an aerodynamic shape and thus adversely impacts range and speed of the munition.

Figure 1:
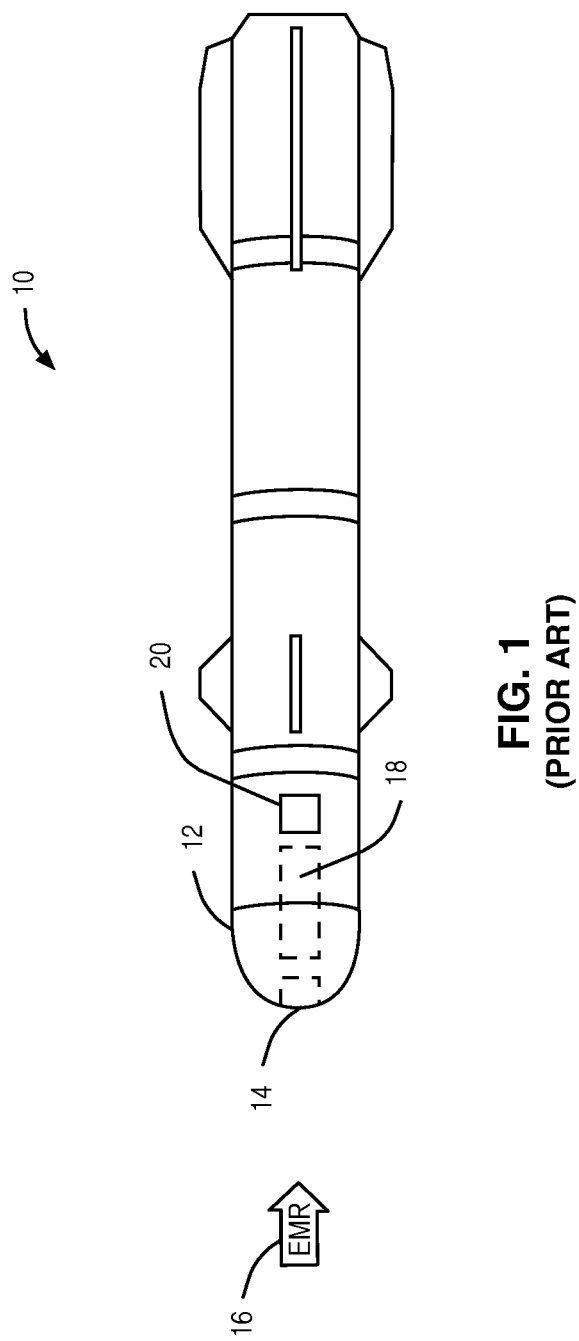
FIG. 1 is a diagram of a conventional munition.

FIG. 1 is a diagram of a conventional munition 10. The conventional munition 10 includes a hollow hemispherical nose cone 12, which includes a window 14 that is optically transparent to EMR of a particular wavelength or waveband. EMR 16 passes through the window 14 and is processed by an optical system 18 that comprises one or more lenses that are configured to focus the EMR 16 onto a detector 20. The hemispherical shape of the hollow hemispherical nose cone 12 reduces aberrations in the EMR 16 that would otherwise occur if the hollow hemispherical nose cone 12 were aerodynamic, such as in the shape of a cone. However, the hemispherical shape is not aerodynamic, and the conventional munition 10 has a reduced range and speed than may otherwise be possible with a more aerodynamic shape.

Figure 2:
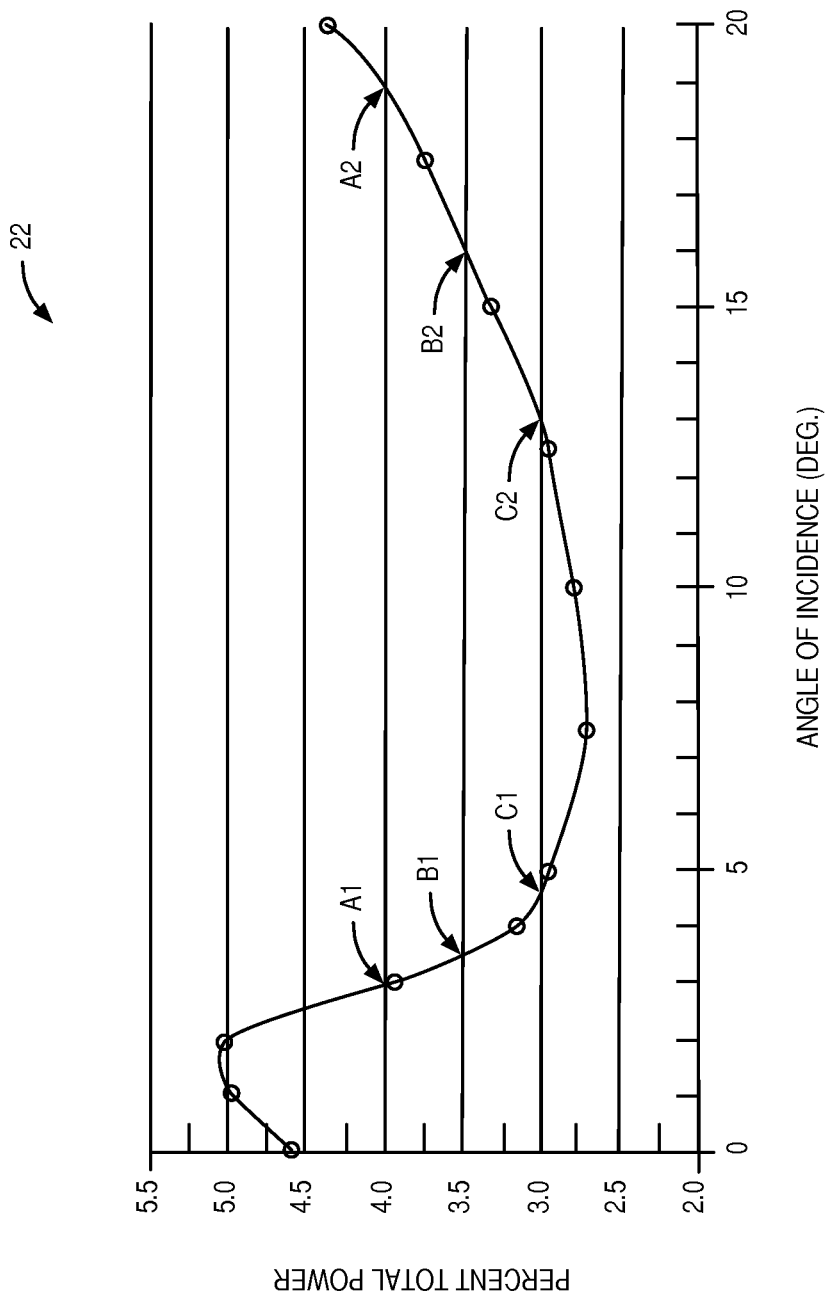
FIG. 2 is a graph of power output by a single detector element in a quadrant detector versus angle of incidence of energy (EMR) (e.g., a transfer curve) received through a surface of a hollow conical nose cone.

FIG. 2 is a graph 22 of power output by a single detector element in a quadrant detector versus angle of incidence of energy (EMR) (e.g., a transfer curve) received through a surface of a hollow conical nose cone. The EMR distortion is such that the quadrant detector receives identical amounts of power at different angles of incidence, rendering it ambiguous as to which angle of incidence was responsible for the signal. For example, the quadrant detector receives the same amount of power when the angle of incidence is at about 3 degrees and at about 18.5 degrees, as illustrated by points A1 and A2; when the angle of incidence is at about 3.5 degrees and at about 16 degrees, as illustrated by points B1 and B2; and when the angle of incidence is at about 5 degrees and at about 13 degrees, as illustrated by points C1 and C2. Thus, the munition guidance system cannot clearly discern the correct angle of incidence at any of such angles of incidence.

Figure 3:
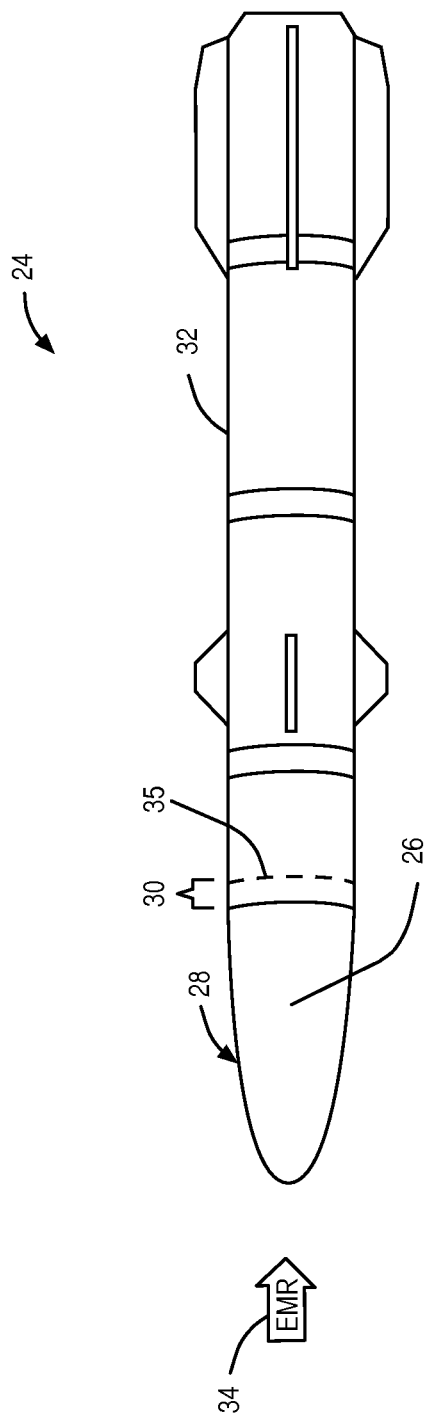
FIG. 3 is a diagram of a munition according to one embodiment.

FIG. 3 is a diagram of a munition 24 according to one embodiment.

The munition 24 includes an aerodynamic, sometimes referred to as conformal, solid nose cone 26 that is transparent to EMR at a desired wavelength or waveband. The solid nose cone 26 may comprise any suitable material that is optically-transparent at the desired wavelength or waveband, including, by way of non-limiting example, polycarbonate, glass, acrylic, or sapphire. The desired wavelength, or waveband, may be based on that of a laser designator used to "paint" a desired target with EMR. The solid nose cone 26 has an exterior surface 28 that is exposed to the atmosphere during flight. The solid nose cone 26 does not include a window 14, as illustrated with regard to FIG. 1. A portion 30 of the solid nose cone 26 may also be enclosed in a munition body 32. The solid nose cone 26, despite being aerodynamic, transfers EMR 34 that is incident upon the exterior surface 28 through the solid nose cone 26 to a detector (not illustrated) without substantial aberration of the EMR 34. The EMR 34 is EMR that is generated by a laser designator, and that is reflected off the surface of a target. In one embodiment, the solid nose cone 26 comprises a solid homogeneous material with no significant voids, bound by an outer leading surface and, having a substantially or extremely flat rear surface 35. The solid nose cone 26 may also have a conical shape and a conical leading surface.

Figure 4:
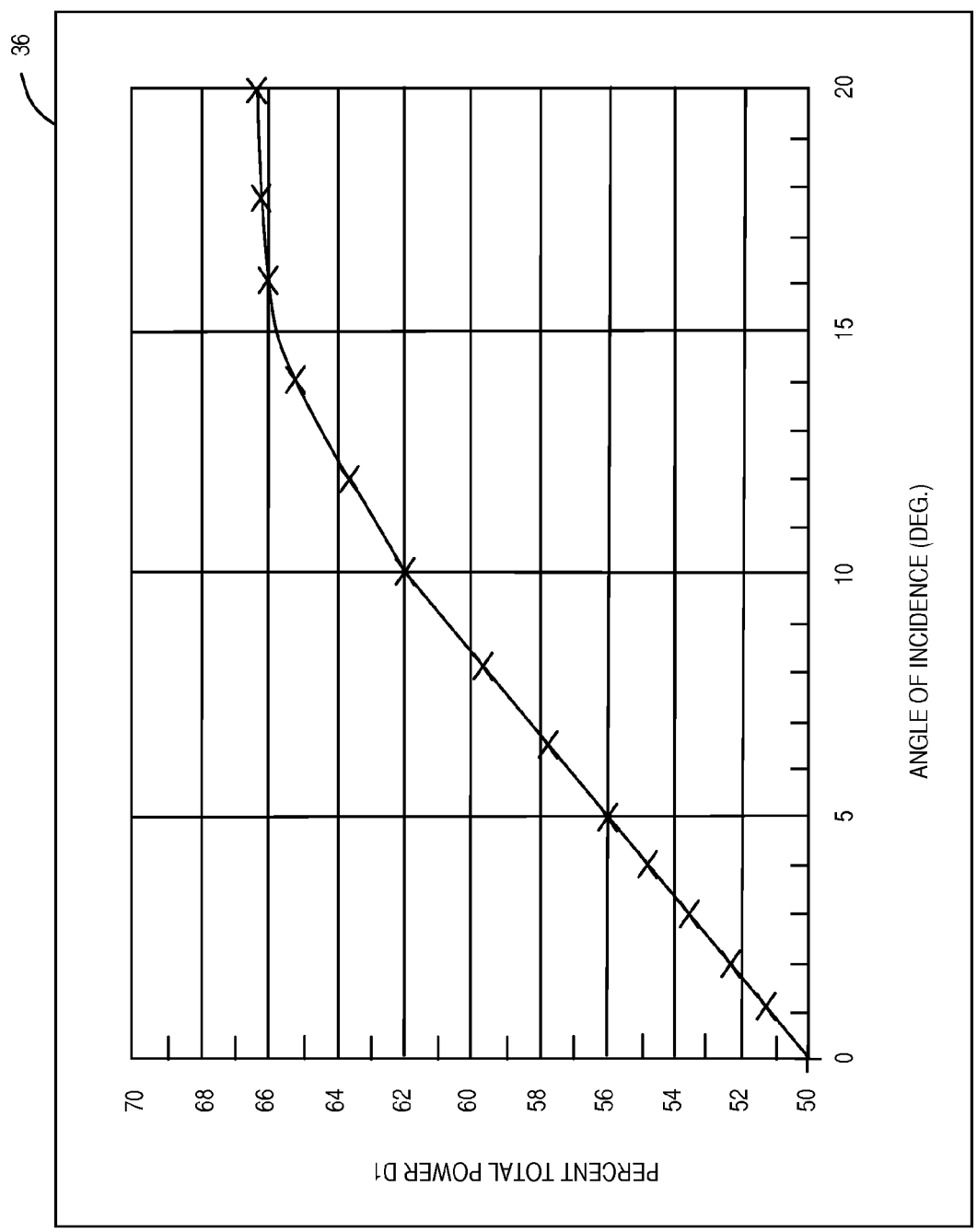
FIG. 4 is a graph of power output by a single detector element in a quadrant detector versus angle of incidence of energy (EMR) (e.g., a transfer curve) received via a solid nose cone that is transparent to EMR in a desired wavelength, or waveband, according to one embodiment.

FIG. 4 is a graph 36 of power output by a single detector element in a quadrant detector versus angle of incidence of energy (EMR) (e.g., a transfer curve) received via a solid nose cone that is transparent to EMR in a desired wavelength, or waveband, according to one embodiment. Thus, as illustrated in FIG. 4, the solid nose cone of the embodiments results in an EMR pattern that uniquely correlates received energy with an angle of incidence up to approximately a 20 degree angle of incidence. Thus, the transfer function that identifies power to angle of incidence of the embodiments has a different value at each angle of incidence within a relatively broad range of angles of incidence, in contrast to the transfer curve illustrated in FIG. 2.

Figure 5:
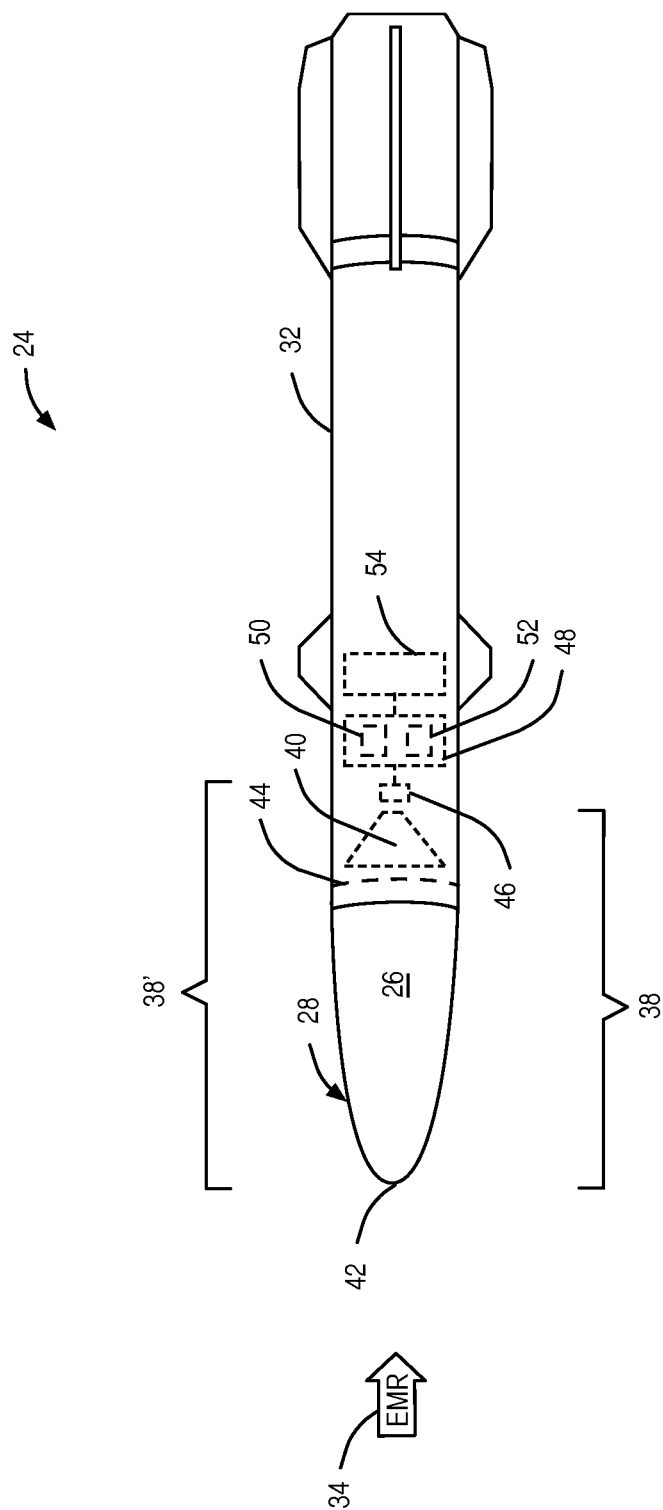
FIG. 5 is a block diagram of a front-end system according to one embodiment.

FIG. 5 is a block diagram of a front-end system 38 according to one embodiment. The front-end system 38 includes the solid nose cone 26 that is transparent to EMR 34 at a desired wavelength, or waveband, and an optical relay adapter (ORA) 40. The solid nose cone 26 may comprise any suitable material that is optically-transparent at the desired wavelength or waveband, including, by way of non-limiting example, polycarbonate, glass, acrylic, or sapphire. The solid nose cone 26 has a leading end 42 and a trailing end 44.

The ORA 40 is configured to relay energy, in the form of EMR, from the trailing end 44 of the solid nose cone 26 to a quadrant detector 46. In one embodiment, the quadrant detector 46 comprises a plurality, such as four in one embodiment, of distinct detector areas, each of which comprises one or more detector elements. Each detector area is configured to generate a signal that is based on a function of an amount or quantity of EMR that is relayed to the detector area by the ORA 40.

The quadrant detector 46 may be coupled to a control system 48, which may comprise, for example, a processor 50 and a memory 52. The control system 48 is capable of interpreting the signals generated by the detector areas of the quadrant detector 46 to determine an angle of incidence of the EMR 34 upon the solid nose cone 26, and thereby control a guidance system 54 that may alter the flight pattern of the munition 24 to ensure intersection of the munition 24 with the source of the EMR 34. The interpretation of the signals by the control system 48 may be based on a predetermined transfer curve associated with the particular solid nose cone 26, such that solid nose cones 26 made of different materials, and/or having different dimensions, may have different predetermined transfer curves. In one embodiment, the quadrant detector 46 comprises four detector areas arranged in a two-by-two matrix configuration.

In some embodiments, the exterior surface 28 is conical and aerodynamic. The exterior surface 28 may be designed based on aerodynamic principles, including, for example, principles espoused by Theodore von Karman, but the shape of the exterior surface 28 is not limited to any particular aerodynamic principle. While the embodiments are not limited to any particular length to diameter ratios, in some embodiments, the ratio of the length of the solid nose cone 26 to a diameter of the solid nose cone 26 is greater than or equal to about 3:2; in other embodiments the ratio of the length of the solid nose cone 26 to the diameter of the solid nose cone 26 is greater than or equal to about 4:1; and in other embodiments the ratio of the length of the solid nose cone 26 to the diameter of the solid nose cone 26 is greater than or equal to about 5:1. In one embodiment, a front-end system 38' includes the solid nose cone 26, the ORA 40, and the quadrant detector 46.

Figure 6B:
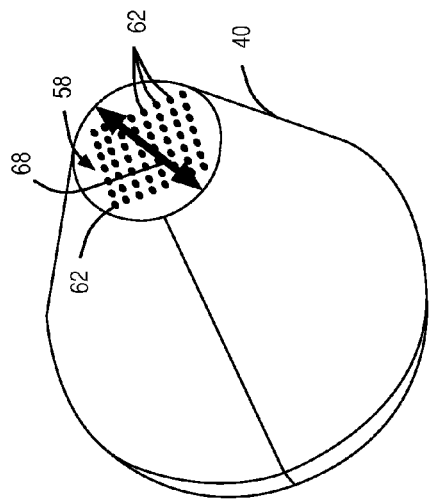
FIGS. 6A and 6B illustrate perspective views of an optical relay adapter (ORA) according to one embodiment.
Figure 6A:
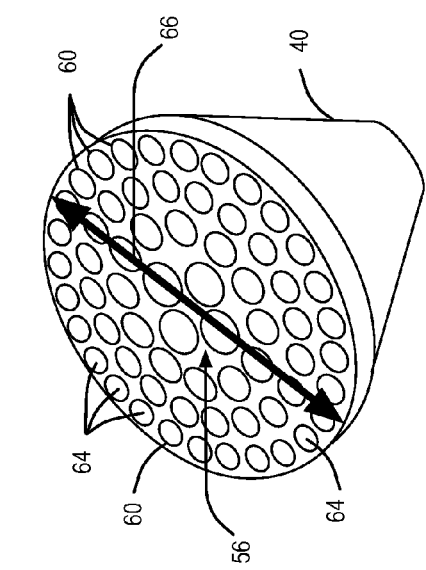

FIGS. 6A and 6B illustrate perspective views of the ORA 40 according to one embodiment. FIGS. 6A and 6B will be discussed together. The ORA 40 has an EMR-receiving front face 56 and an EMR-emitting rear face 58. The EMR-receiving front face 56 forms a plurality of openings 60 and the EMR-emitting rear face 58 forms a plurality of openings 62. Each of the openings 60 correspond to one of the openings 62. The ORA 40 also includes a plurality of EMR-passing channels 64 that extend from the EMR-receiving front face 56 to the EMR-emitting rear face 58. Each EMR-passing channel 64 couples an opening 60 to an opening 62 and is configured to pass EMR entering an opening 60 to the corresponding opening 62. Thus, collectively, EMR received by the ORA 40 from the trailing end 44 of the solid nose cone 26 is relayed, or otherwise transmitted, from the EMR-receiving front face 56, through the plurality of EMR-passing channels 64, and out the EMR-emitting rear face 58 toward the quadrant detector 46. The quadrant detector 46 is thus optically coupled to the EMR-emitting rear face 58. Notably, the front-end system 38 eliminates the need for any lens between the trailing end 44 and the quadrant detector 46, because the solid nose cone 26 essentially operates as a lens to focus the EMR 34 onto the ORA 40.

In one embodiment, the size, or diameter 66 of the EMR-receiving front face 56 is based on a diameter of the trailing end 44 of the solid nose cone 26. The openings 60 are spatially configured on the EMR-receiving front face 56 based on the diameter of the trailing end 44 of the solid nose cone 26. In one embodiment, a diameter 68 of the EMR-emitting rear face 58 is based on a size of the quadrant detector 46, and the openings 62 are spatially configured on the EMR-emitting rear face 58 based on the size of the quadrant detector 46.

It will be appreciated that the ORA 40 illustrated in FIG. 5 is merely one embodiment, and the particular characteristics of the ORA 40 may differ based on various criteria, including diameter and/or shape of the trailing end 44 of the solid nose cone 26, size and/or shape of the quadrant detector 46, and other criteria. In one embodiment, the EMR-passing channels 64 comprise fiber optic cables having a diameter at the EMR-receiving front face 56 between about 100 microns and about 10 microns, and that taper to a smaller diameter at the EMR-emitting rear face 58.

Figure 7:
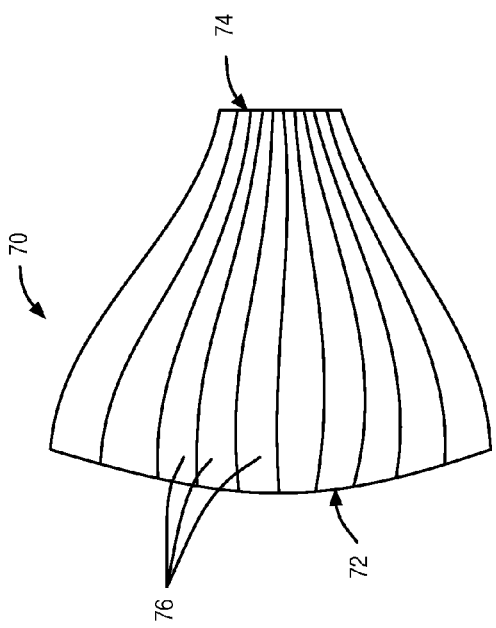
FIG. 7 illustrates a perspective view of an ORA according to another embodiment.

FIG. 7 illustrates a perspective view of an ORA 70 according to another embodiment. The ORA 70 has an EMR-receiving front face 72, an EMR-emitting rear face 74, and a plurality of EMR-passing channels 76 (only some of which are labelled in FIG. 7) that couple openings in the EMR-receiving front face 72 to openings in the EMR-emitting rear face 74.

Figure 8A:
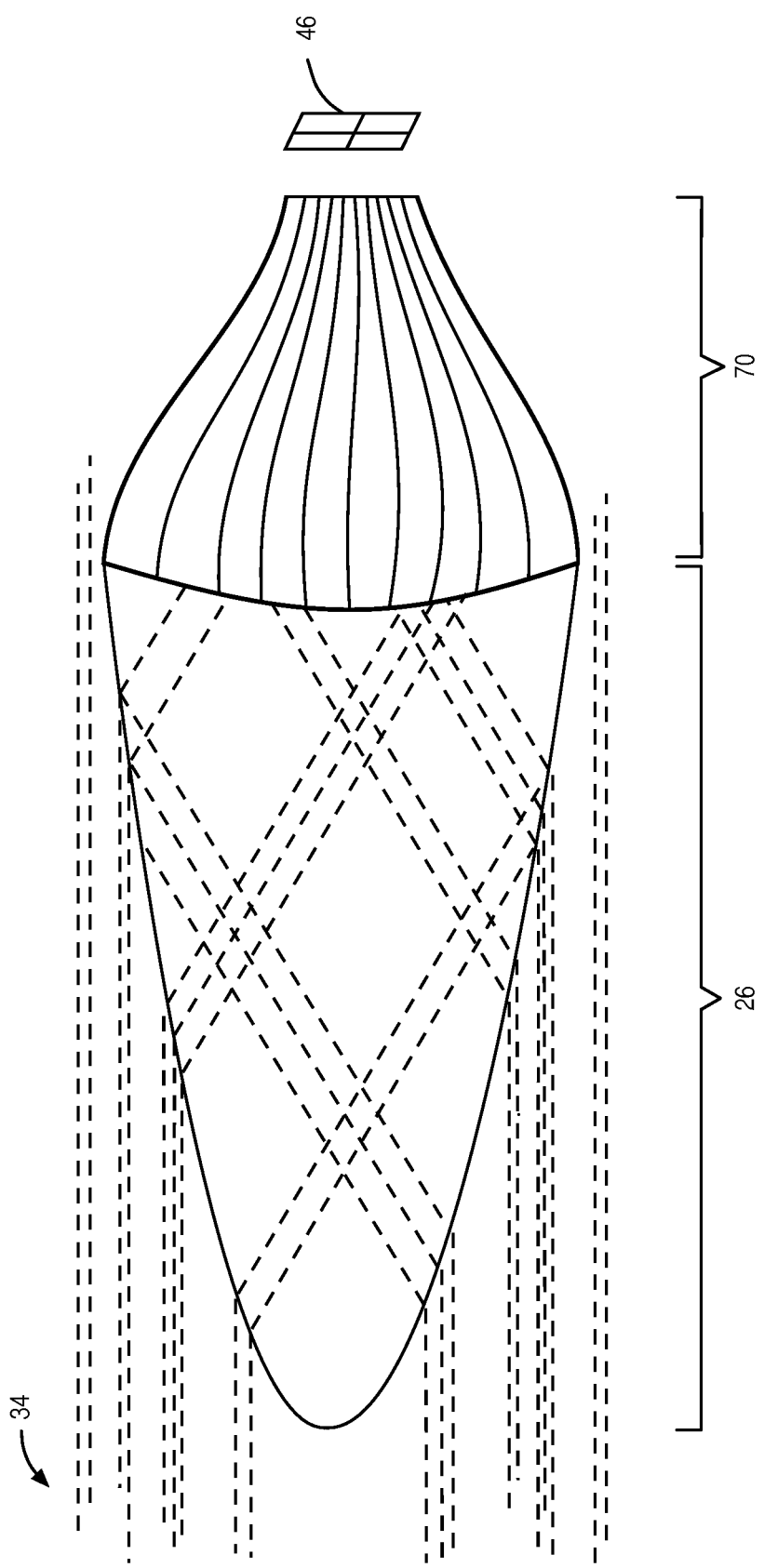
FIGS. 8A-8C illustrate a solid nose cone in flight and moving in a direction with respect to a direction of reflected EMR according to one embodiment.

FIG. 8A illustrates the solid nose cone 26 in flight and moving in a direction that is substantially parallel, or on axis, with respect to the direction of the EMR 34 reflected from a desired target (not illustrated). At least some of the EMR 34 that is incident on the solid nose cone 26 enters the solid nose cone 26 because the solid nose cone 26 is transparent to the wavelength, or waveband, of the EMR 34. The EMR 34 is ultimately received by the ORA 70 and channeled to the quadrant detector 46. The pattern of the EMR 34 formed on the quadrant detector 46 can be determined by the control system 48 (not illustrated) to indicate on-axis flight of the solid nose cone 26.

Figure 8B:
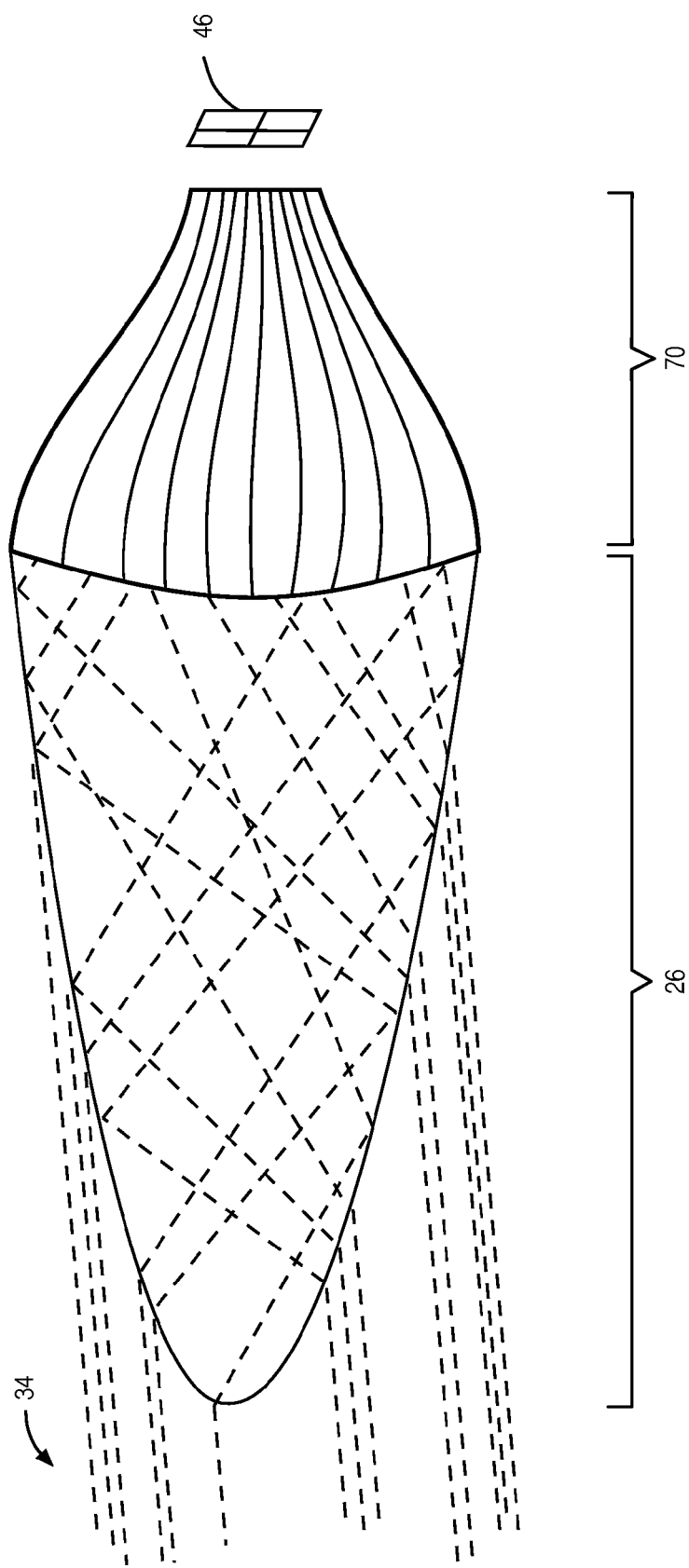

FIG. 8B illustrates the solid nose cone 26 in flight and moving in a direction that is approximately five degrees off axis with respect to the direction of the EMR 34 reflected from a desired target (not illustrated). At least some of the EMR 34 that is incident on the solid nose cone 26 enters the solid nose cone 26 because the solid nose cone 26 is transparent to the wavelength, or waveband, of the EMR 34. The EMR 34 is ultimately received by the ORA 70 and channeled to the quadrant detector 46. The pattern of the EMR 34 formed on the quadrant detector 46 differs from that in FIG. 8A, and can be determined by the control system 48 (not illustrated) to indicate a five degree off-axis flight of the solid nose cone 26.

Figure 8C:
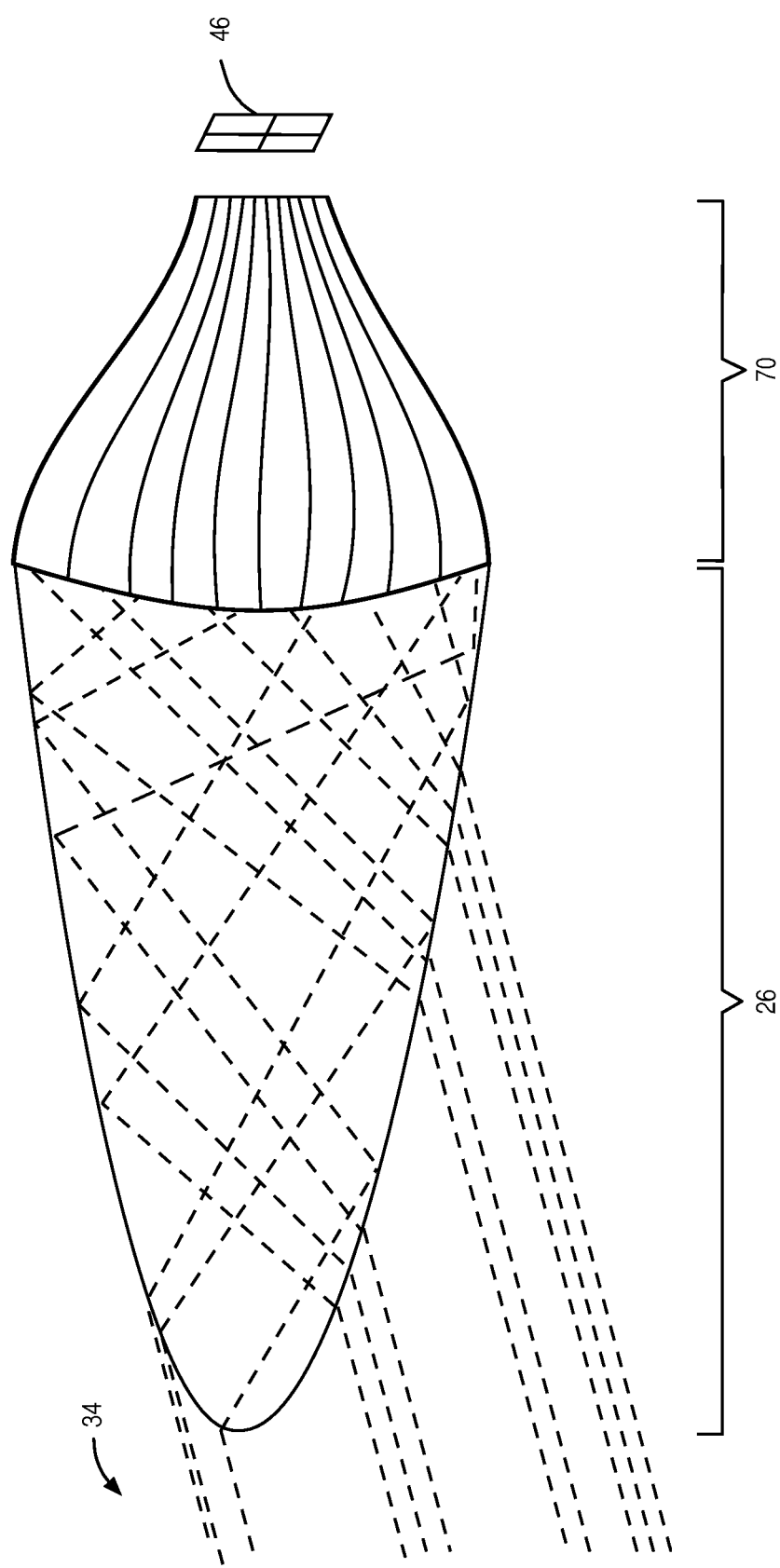

FIG. 8C illustrates the solid nose cone 26 in flight and moving in a direction that is approximately fifteen degrees off axis with respect to the direction of the EMR 34 reflected from a desired target (not illustrated). At least some of the EMR 34 that is incident on the solid nose cone 26 enters the solid nose cone 26 because the solid nose cone 26 is transparent to the wavelength, or waveband, of the EMR 34. The EMR 34 is ultimately received by the ORA 70 and channeled to the quadrant detector 46. The pattern of the EMR 34 formed on the quadrant detector 46 differs from that in FIGS. 8A and 8B, and can be determined by the control system 48 (not illustrated) to indicate a fifteen degree off-axis flight of the solid nose cone 26.

FIG. 9 is a block diagram of a front-end system 80 according to another embodiment. In this embodiment, the trailing end 44 has a first area size at an intersection location 82 of an exit plane 84 that lies perpendicular to a longitudinal axis 86 of the solid nose cone 26. The quadrant detector 46 is directly optically coupled to the trailing end 44, without any intervening elements between the trailing end 44 and the quadrant detector 46, and thus, EMR 34 exiting the trailing end 44 of the solid nose cone 26 is emitted directly onto the quadrant detector 46.

FIG. 10 illustrates a cross-section 88 of the solid nose cone 26 illustrated in FIG. 9, along the exit plane 84. The cross-section 88 has a diameter 90.

FIG. 11 is a block diagram of the quadrant detector 46 according to one embodiment, wherein a length 92 of the sides of the quadrant detector 46 are the same length as the diameter 90 illustrated in FIG. 10. Each of the detector areas 94A-94D is configured to generate a signal that is based on a function of an amount or quantity of EMR that is incident on the respective detector area 94.

FIG. 12 is a block diagram of a quadrant detector 96 that is suitable for use in the front-end system 80 illustrated in FIG. 9, in lieu of the quadrant detector 46. In this embodiment, the quadrant detector 96 has a circular shape, and has a diameter 98 that is substantially the same as the diameter 90 illustrated in FIG. 10. Each of the detector areas 100A-100D is configured to generate a signal that is based on a function of an amount or quantity of EMR that is incident on the respective detector area 100.

Those skilled in the art will recognize improvements and modifications to the preferred embodiments of the present disclosure. All such improvements and modifications are considered within the scope of the concepts disclosed herein and the claims that follow.

What is claimed is:

1. A front-end system for a laser-guided munition, comprising:
    a solid nose cone that is transparent to electromagnetic radiation (EMR) of a particular wavelength and having an exterior surface, a leading end and a trailing end, the solid nose cone being configured to pass the EMR of the particular wavelength incident on the exterior surface to the trailing end; and
    an optical relay adapter (ORA) having an EMR-receiving front face and an EMR-emitting rear face, the EMR-receiving front face being optically coupled to the trailing end, the ORA being configured to relay the EMR from the EMR-receiving front face to the EMR-emitting rear face.

2. The front-end system of claim 1, further comprising a quadrant detector optically coupled to the EMR-emitting rear face.

3. The front-end system of claim 2, wherein the system is configured to pass EMR from the trailing end of the solid nose cone to a quadrant detector without a lens.

4. The front-end system of claim 2, wherein no lens is present in a path from the trailing end of the solid nose cone to a quadrant detector.

5. The front-end system of claim 2, wherein
    the solid nose cone has a longitudinal axis, wherein the trailing end has a first area size at an intersection location of an exit plane that lies perpendicular to the longitudinal axis, the exit plane intersecting the trailing end,
    the ORA optically coupled to the exit plane.

6. The front-end system of claim 5, wherein the quadrant detector has a second area size substantially equivalent to the first area size.

7. The front-end system of claim 5, wherein the quadrant detector has a square perimeter having four sides, each side substantially equivalent in length to a diameter of the trailing end.

8. The front-end system of claim 1, wherein the exterior surface is a conical surface.

9. The front-end system of claim 8, wherein a ratio of a length of the solid nose cone to a diameter of the solid nose cone is greater than or equal to 3:2.

10. The front-end system of claim 1, wherein the solid nose cone comprises one of polycarbonate, glass, acrylic, and sapphire.

11. The front-end system of claim 1, wherein the EMR-receiving front face forms a plurality of first openings and the EMR-emitting rear face forms a plurality of second openings, each second opening corresponding to one of the first openings.

12. The front-end system of claim 11, wherein the ORA comprises a plurality of EMR-passing channels, each EMR-passing channel coupling one of the first openings in the EMR-receiving front face to a corresponding second opening in the EMR-emitting rear face.

13. The front-end system of claim 12, wherein the first openings in the EMR-receiving front face are spatially configured based on a diameter of the trailing end of the solid nose cone.

14. The front-end system of claim 13, further comprising a quadrant detector optically coupled to the EMR-emitting rear face wherein the second openings in the EMR-emitting rear face are spatially configured based on a size of the quadrant detector.

15. The front-end system of claim 14, wherein the quadrant detector comprises four distinct detector areas, each of the four distinct detector areas configured to emit an output signal based on an amount of EMR incident upon the respective detector area.

16. The solid nose cone of claim 1, wherein the solid nose cone is a solid homogeneous material.

* * * * *